Jan. 5, 1926.　　　　　　　　　　　　　　1,568,377
G. F. GREEN
WEEDER
Filed June 5, 1924　　　2 Sheets-Sheet 1
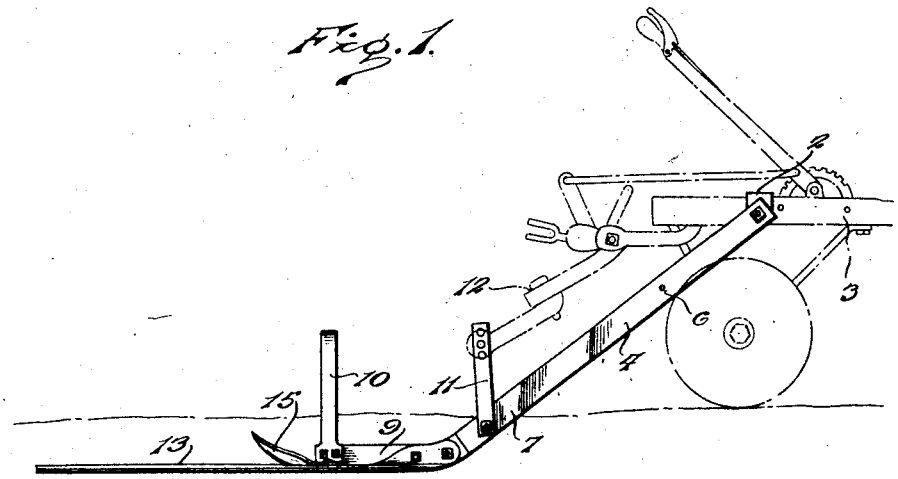
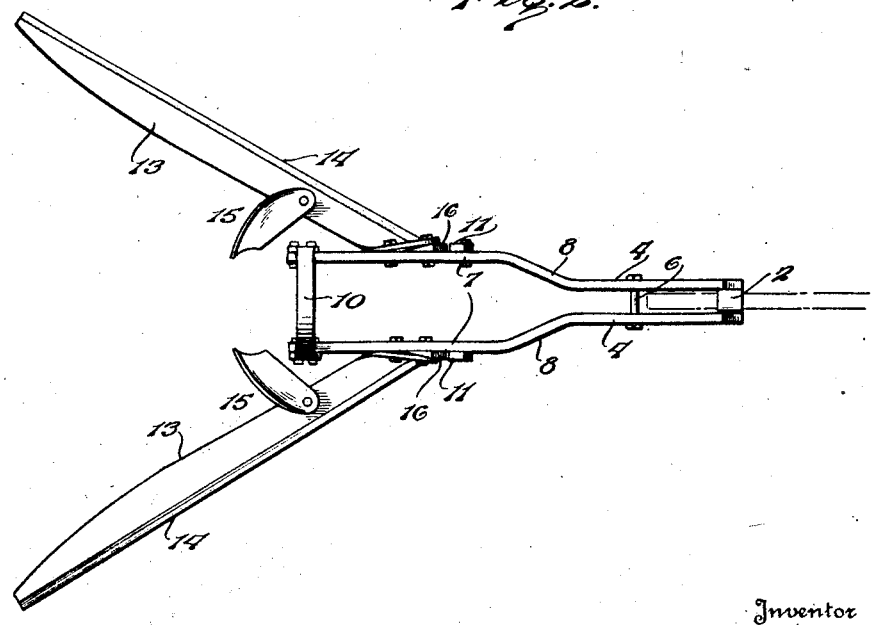
Inventor
G. F. Green
By Lacey & Lacey, Attorneys Jan. 5, 1926.   1,568,377
G. F. GREEN
WEEDER
Filed June 5, 1924   2 Sheets-Sheet 2
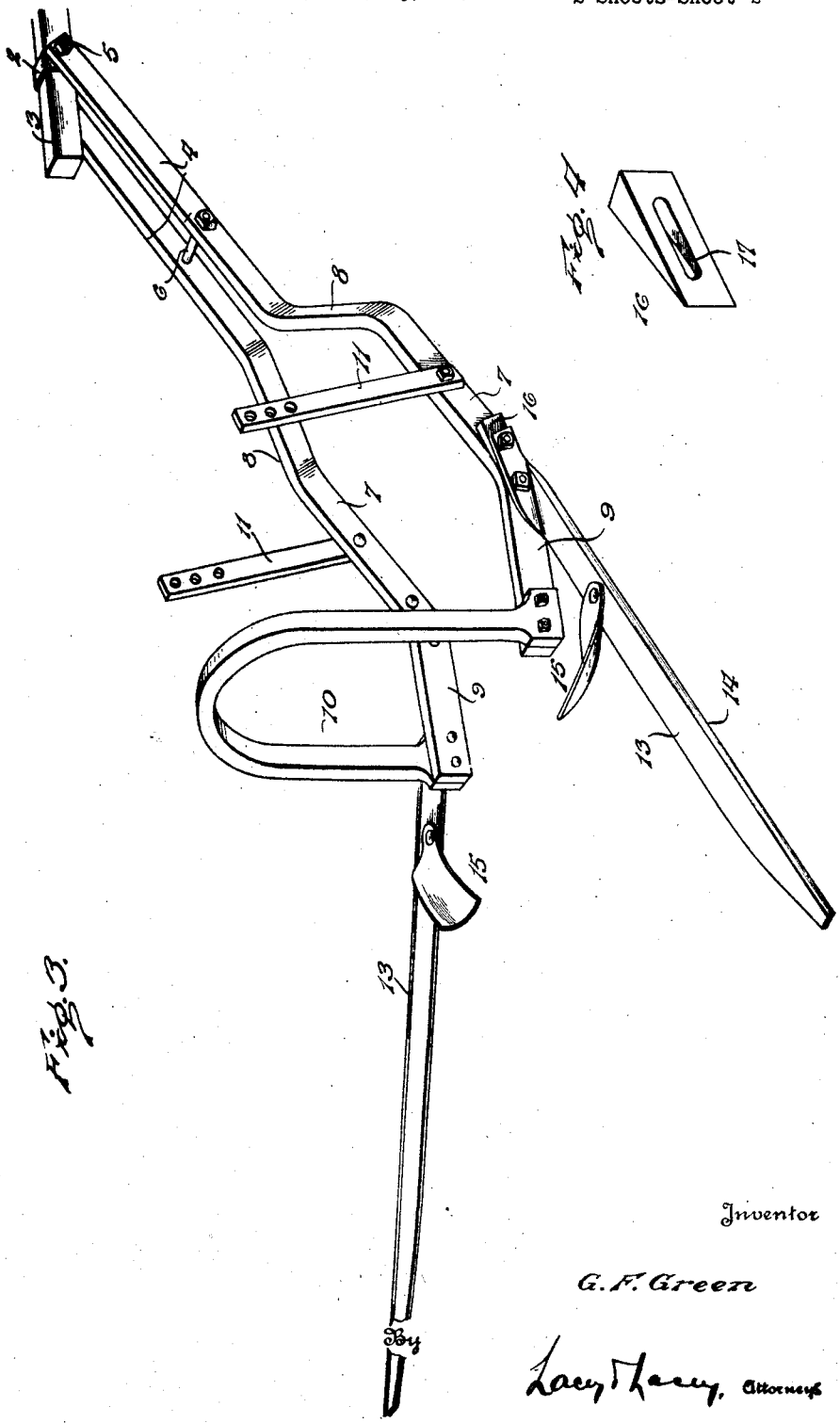

Patented Jan. 5, 1926.

1,568,377

UNITED STATES PATENT OFFICE.

GEORGE F. GREEN, OF TEXICO, NEW MEXICO.

WEEDER.

Application filed June 5, 1924. Serial No. 718,081.

*To all whom it may concern:*

Be it known that I, GEORGE F. GREEN, a citizen of the United States, residing at Texico, in the county of Curry and State of New Mexico, have invented certain new and useful Improvements in Weeders, of which the following is a specification.

The object of this invention is to provide an inexpensive and efficient device which may be secured to an agricultural implement and drawn along a row of plants or over a field so as to cut through the roots of weeds and remove the same in order that the young plants may have an unobstructed growth. Another object of the invention is to provide a weeder having means whereby the loose top soil may be deflected around the roots of young tender plants so as to protect them from injury and facilitate their growth. Other incidental objects of the invention will appear in the course of the following description.

In the accompanying drawing, which illustrate one embodiment of my invention,

Figure 1 is a side view of my improved weeder;

Fig. 2 is a plan view of the same;

Fig. 3 is an enlarged perspective view, and

Fig. 4 is a detail.

In the drawings, the reference numeral 1 indicates a portion of a cultivator frame to which my weeder may be attached. The cultivator frame may be of any well-known structure and, in itself, forms no part of my invention so that I have deemed detailed illustration and description of the same unnecessary, although incidental mention may be made hereinafter of some parts of the cultivator in order that the utility of my weeder may be fully comprehended.

In carrying out my invention, I employ a bracket 2 which may conveniently be in the form of an inverted U-shaped clip or a collar adapted to encircle the tongue 3 of the cultivator, and to the sides of this bracket or collar I pivotally attach the front ends of frame bars 4 which extend downwardly and rearwardly from the bracket. The pivot for these frame bars may conveniently be the bolt 5 by which the clip or bracket is secured in place upon the tongue and the bars are so constructed as to provide upper parallel portions held together by a connecting bolt 6, and lower parallel portions 7 which are spaced apart a greater distance than the upper portions and are integrally connected therewith by divergent portions 8, the rear end portions of the frame bars being disposed at an angle to the parallel portions 7, as shown at 9, whereby they may run upon the surface of the ground without digging into the same, and the extremities of the said frame bars being connected by an arched brace 10 whereby spreading of the frame bars will be prevented but clearance will be provided for the young plants. At an intermediate point of the portions 7 of the frame bars, I secure thereto the upstanding arms or posts 11 which are adapted to be pivotally connected to the rearwardly extending arms or brackets 12 of the cultivator, these brackets or arms being the same brackets or arms which ordinarily support the ground-engaging members of the cultivator. The said arms are movable in vertical planes through the medium of a hand lever with which the cultivator is equipped and, in the use of my device, the lever is set as to cause the device to run at any desired depth below the surface of the ground. To the outer sides of the frame bars near the rear ends thereof and preferably at the junction of the inclined portions 7 and the horizontal portions 9, I secure the front ends of blades 13 which diverge rearwardly from the frame bars and have their forward edges beveled so as to form cutting surfaces, as indicated at 14. To the blades, I secure moldboards or deflectors 15 which extend inwardly from the blades and are given a curvilinear form whereby their rear outer edges will extend upwardly so that, as the device is drawn along the row of plants, the loose surface soil will be taken up by the moldboards and deflected so as to be turned over to and about the stems of the young tender plants to protect the same and accelerate their growth. Between the front end of each blade and the adjacent frame bar, I insert a wedge 16 which is provided with a longitudinal slot 17 to accommodate the front bolt by which the blade is secured. By shifting the wedge forwardly or rearwardly, the blade may be caused to diverge from the frame bar to a greater or less degree as may be desired.

The device may be attached to any type of cultivator frame or other agricultural implement and is drawn along the field with the blades 13 running below the surface of the same so that the forward cutting edges of the blades will be drawn against and through the roots of any weeds which may have sprung up and will thereby destroy such growths. The blades are rigidly secured to the frame bars and the frame bars are effectually prevented from spreading through the provision of the arched connecting brace 10 and the connecting bolt 6 so that the blades will be held firmly in the operative relation to the frame and to each other and will be caused to run along a row at the sides of the same to eliminate obnoxious growth. The device is exceedingly simple and may be produced at a very low cost. It will be of light draft and will be found highly efficient in use for the purposes for which it is designed.

Having thus described the invention, I claim:

A weeder comprising similar frame bars adapted at their front ends to be pivotally secured to an agricultural implement, said bars extending downwardly and rearwardly, the intermediate portions of the bars diverging laterally to clear plants, and their rear extremities being parallel and disposed horizontally to run upon the ground, an arched rigid brace connecting the rear extremities of the frame bars, upstanding arms on the frame bars at intermediate points thereof to be connected to a lifting element on the cultivator, flat blades each secured at its front end to the outer side of one of the frame bars and extending rearwardly and outwardly therefrom, and a mold board secured on each blade in rear of the the respective frame bar and projecting inwardly from the blade.

In testimony whereof I affix my signature.

GEORGE F. GREEN. [L. S.]